(12) United States Patent
Borrell et al.

(10) Patent No.: US 6,690,484 B1
(45) Date of Patent: Feb. 10, 2004

(54) ANTIPATTERNING PRINTMODE FOR MATRIX-BASED SCATTERED-DITHERED IMAGES IN INCREMENTAL PRINTING

(75) Inventors: Ramón Borrell, Sant Cugat del Valles (ES); Lluís Viñals, Sant Cugat del Valles (ES); Jordi M. Gomez, Sant Cugat del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/252,141

(22) Filed: Feb. 18, 1999

(51) Int. Cl.$^7$ ............................. G06F 15/00; G06K 1/00
(52) U.S. Cl. ...................... 358/1.9; 358/454; 358/298; 358/458; 358/533; 358/534; 358/536; 358/535; 358/456; 358/457; 347/43; 347/12; 347/9
(58) Field of Search ................................ 347/43, 12, 9; 358/1.9, 454, 298, 458, 533, 534, 536, 535, 456, 457

(56) References Cited

U.S. PATENT DOCUMENTS

| | | | | |
|---|---|---|---|---|
| 4,149,194 A | * | 4/1979 | Holladay .................... 358/3.16 |
| 4,897,736 A | * | 1/1990 | Sugino ........................ 358/1.9 |
| 4,912,568 A | * | 3/1990 | Shimano ...................... 347/253 |
| 5,640,249 A | * | 6/1997 | Rao et al. .................... 358/3.1 |
| 5,854,882 A | * | 12/1998 | Wang .......................... 358/1.9 |
| 5,903,713 A | * | 5/1999 | Daels et al. .................. 358/1.9 |
| 5,963,715 A | * | 10/1999 | Shu et al. .................... 358/1.9 |
| 6,069,709 A | * | 5/2000 | Harrington ................... 347/101 |
| 6,157,461 A | * | 12/2000 | Doron et al. .................. 358/1.9 |
| 6,183,055 B1 | * | 2/2001 | Kanematsu et al. ............. 347/9 |
| 6,252,679 B1 | * | 6/2001 | Wang .......................... 358/1.9 |
| 6,515,768 B1 | * | 2/2003 | Deschuytere et al. ......... 358/3.06 |

\* cited by examiner

*Primary Examiner*—Kimberly A. Williams
*Assistant Examiner*—Ashanti Ghee
(74) *Attorney, Agent, or Firm*—Peter I. Lippman

(57) ABSTRACT

Apparatus defines a dither mask (DM) and printmask (PM) with corresponding dimensions. In one invention form the DM dimension is not an integral factor or multiple of the PM dimension. The two dimensions may be lengths or widths; preferably the apparatus manages both; the corresponding dimensions differ by at least three pixels, and by a multiple of two pixels—more preferably eight or a multiple of eight. Preferably one dimension is an integral multiple of 256 pixels differing by eight pixels from the other. Another invention form has a scanning printhead making multiple passes across a print medium to form swaths of marks, a mechanism to define an offset smaller than at least one of the two dimensions, and a unit to index one mask by that offset between forming of successive swaths. This is valuable if DM and PM are established by preprogrammed circuits (e.g. an ASIC) or algorithms and one dimension is fixed at an integral multiple or factor of the other, with the system being practically incapable of small (or any) changes in the dimensions. Another invention form is a print method that establishes and operates a rendition stage using a DM—and a PM stage using a PM.

26 Claims, 10 Drawing Sheets

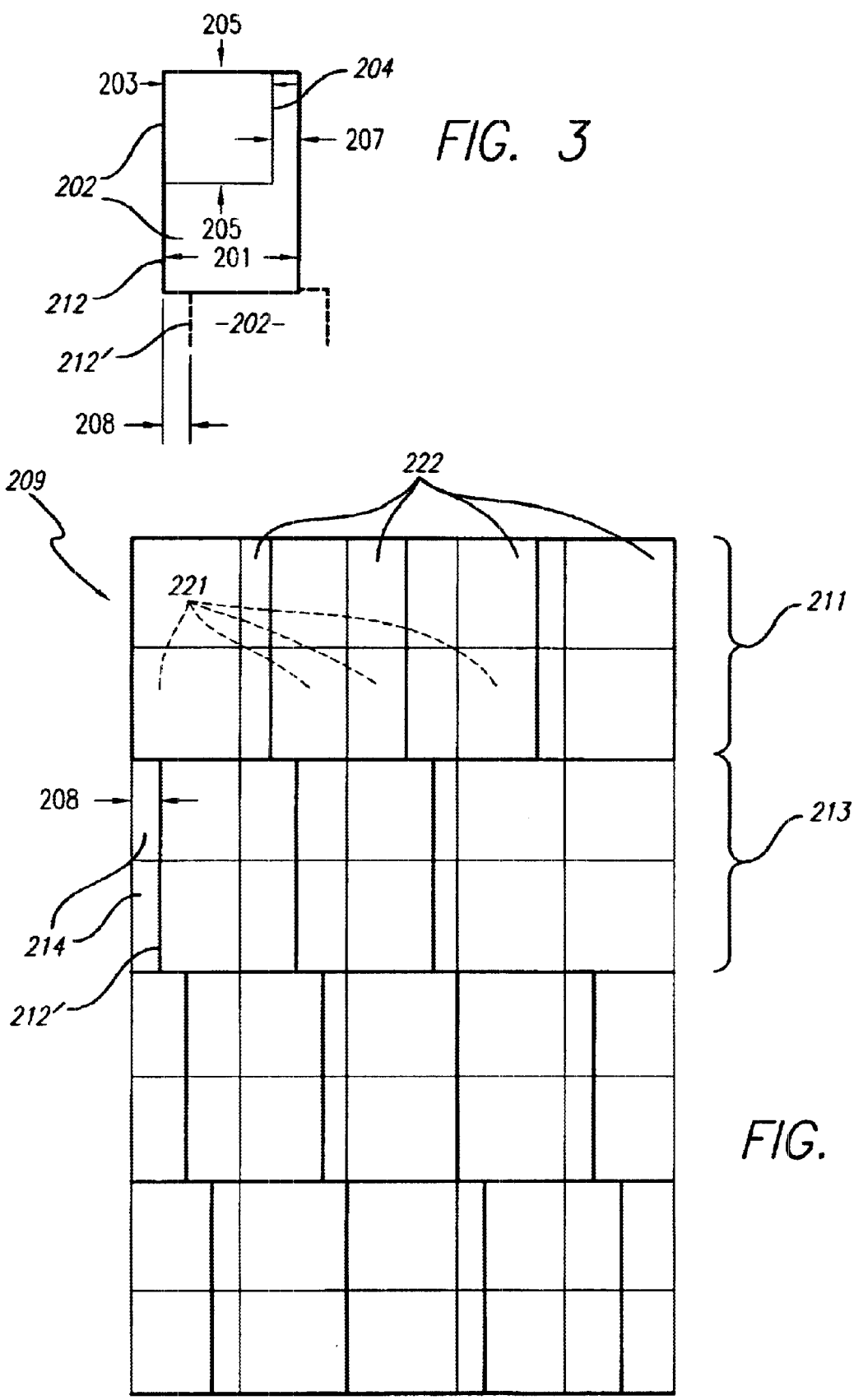

ANTIPATTERNING PRINTMODE FOR MATRIX-BASED SCATTERED-DITHERED IMAGES IN INCREMENTAL PRINTING

RELATED PATENT DOCUMENTS

Closely related documents are coowned U.S. Pat. No. 5,317,418 of Qian Lin, U.S. Pat. No. 5,473,446 of Perumal and Dillinger, and U.S. Pat. Nos. 5,555,006 and 5,677,716 of Cleveland—and also U.S. patent applications Ser. Nos. 08/057,244 and 08/308,321 of Lin, issued respectively as U.S. Pat. Nos. 5,469,515 and 5,760,920; Ser. No. 08/957,853 of Doron et al., issued as U.S. Pat. No. 6,157,461; Ser. Nos. 09/042,880 and 09/184,577 of Askeland, issued respectively as U.S. Pat. Nos. 6,185,002 and 6,184,577; and Ser. No. 09/150,322 in the name of Garcia, issued as U.S. Pat. No. 6,542,258. Each of these documents in its entirety is incorporated by reference into this present document.

FIELD OF THE INVENTION

This invention relates generally to machines and procedures for printing text or graphics on printing media such as paper, transparency stock, or other glossy media; and more particularly to a scanning machine and method that construct text or images from individual ink spots created on a printing medium, in a two-dimensional pixel array. Thermal-inkjet printers and processes are of greatest interest.

The invention is applicable, however, in other types of units such as, for example only, piezodriven inkjet printers and hot-wax transfer printers. The invention coordinates dither masking and printmode techniques in such a way as to optimize image quality with minimal disturbance of preestablished data structures and control programming.

BACKGROUND OF THE INVENTION

This section introduces the basis and history of a particularly persistent category of undesirable printing artifacts that impair the quality of images made with incremental printers. Those artifacts are very peculiar-appearing and repetitive patterns that appear superimposed on, usually, rather uniform colorant fields in the middle tonal range.

These patterns are particularly undesirable because they repeat, and therefore often manifest themselves as spurious banding or tiling within the image. (Some curious shapes may appear even in the absence of repetition or other distracting systematic character, but such shapes generally go unnoticed or accepted.)

(a) Rendition—Incremental printers are generally capable of creating only a relatively small number of colors at each picture-element (pixel) position—particularly as compared with the millions of colors that can be developed on a computer or television screen, or the virtually continuous gradations available through photography. To enable incremental printers to simulate the finer gradations provided by such other technologies, workers in the incremental-printing field have developed techniques known as "rendition".

Prominent rendition methods include scattered dither and error diffusion. Such techniques aim to reproduce midtones of colors by, in effect, averaging colors—over a number of pixels that is relatively large in comparison with just a single pixel, but still rather small as compared with the spatial resolving power of the human eye.

Scattered dither in printed images thus smoothly spreads fine dots on the printing medium in such a way that the average reflected light per unit of surface—taking into account the unprinted space on the medium, between dots, as well as the printed dots—matches the light intensity of the desired tone. It is important to spread the dots smoothly because unevenness in spatial distribution of the dots creates grainy or noisy images that are often objectionable to the viewer. Other methods such as error diffusion can assign locations to dots to be printed without generating repeating patterns—but require much more computing power in the computer or host, or both. Error diffusion, furthermore, although producing no repetitive patterns does often generate systematically propagating patterns. These patterns too can be obtrusive when seen in nominally uniform fields. Error diffusion is therefore most typically reserved for photograph-like pictures or other images having many small details that obscure the propagating patterns.)

Heretofore it has been recognized by many workers in this field that unevenness in dither-type rendition may be associated with particular dither matrices used. Some such efforts are discussed below.

It has also been recognized by many, however, that unevenness may be associated with a separate function known as "printmasking". Printmasks are used to allocate or distribute the selected dots among successive printhead passes over the printing medium. These efforts too are outlined below.

(b) Dither—As to dither matrices, unevenness in spatial distribution of dots may arise from the quality of the matrices themselves, or from the interaction of such dither matrices with other parts of the writing system that affect the final placement of dots on the print medium. More specifically, consistent dot-placement error (DPE) when combined with the use of dither matrices creates unevenness that repeats consistently throughout an image, creating intrusively unpleasant patterning and banding.

For present purposes it is important to understand precisely how such patterns develop so that they physically appear in a finished, printed image on a physical printing medium. The prime mechanism for development of a pattern is the repetitive recurrence of particular dot-placement errors (DPEs) in the same positions of a particular tiled mask.

DPE is basically a fingerprint of each infinitesimal irregularity of firing direction and speed, and drop volume as well, for each of the many different nozzles in a particular printhead. Image dithering is performed using threshold matrices that provide the spatial distribution of dots to be printed for every tonal value.

Now, when a certain DPE characteristic is registered in a particular way with a certain dither mask (or print-mask), and used to print a midtone field, the unique printhead DPE characteristic and unique mask characteristic in combination produce, potentially, a distinctive set of shapes.

The qualifying term "potentially" is used here because it has not yet been shown how the dither-mask pattern is preserved through the printing process and expresses itself through the printhead DPE pattern to form noticeable patterns on the printing medium. That will be demonstrated shortly. For the moment, to enable further intermediate discussion, that demonstration may be taken on faith.

Since each matrix has limited size, it must be stepped and repeated, over and over in both directions, to entirely fill all the space to be printed with the tone. Thus if the midtone field is uniform or roughly uniform, throughout an area that extends over multiple units of the same mask, then those distinctive shapes appear tiled across and down that area. The resulting appearance is sometimes quite conspicuous, and in extreme cases even distracts from the subject matter of the image.

Accordingly some previous workers have striven to provide dither masks having an ideal degree of randomness. The objective of such work has been to avoid both the appearance of patterns due to excessive regularity within earlier dither masks, on the one hand, and the appearance of graininess due to excessive randomness on the other hand—while at the same time achieving a desired level of vividness in resulting colors. Some advances in this area are due to Qian Lin, Paul Dillinger and Alexander Perumal as reported in their above-mentioned documents.

Such work has been extremely useful and successful in many regards, including virtual elimination of systematic-looking patterns within individual dither masks. These innovations, however, have fallen far short of eliminating larger patterns.

This is because the pattern of an individual mask, even though not itself systematic-looking or even noticeable when considered internally and singly, does look conspicuously systematic when stepped and repeated—in its entirety—multiple times across or down a page. The contorted, random crawling patterns (FIG. 1) are sometimes reminiscent of inkblots, gray matter, or, appropriately, a can of worms. They are at least as disturbing as the systematic patterns created with earlier, internally more-regular masks.

The above-mentioned Askeland documents report methods for attacking this repetition of dither-mask/DPE interactions. One of Askeland's techniques provides plural "superpixels" (related to dither masks) and introduces randomness into the selection of the superpixel to be applied at each pixel position.

The other Askeland document defines plural, colorimetrically equivalent tonal levels that can be used in randomized selection of either dither masks or printmasks. Askeland displays results that appear to represent significant improvement.

For purposes of the present invention it is noteworthy that the dimensions—in pixels—of dither masks are essentially always powers of two. This fact arises from the well-known use of binary devices virtually throughout the computing world.

One consequence of that predominant usage is a very great efficiency and convenience advantage which results, in both data handling and program management, from working with values that are simple in binary terms. Those values are of course powers, or at the very least multiples, of two.

(c) Printmasks—Many other workers have looked to the printmasking function for cures to the twin problems of unevenness and patterning. Thus the earlier-noted work of Doron and of Garcia explores divergent approaches to obtaining randomness in printmasks—and optimizing the degree or intensity of that randomness.

Printmasking is a well-known and important function that promotes two important objectives. First, it tends to avoid the deposition of too much colorant, in excessively localized areas of the printing medium, within too-short time periods. In the absence of such provisions, colorant may coalesce within the pixel grid, causing not only undesired color bleed (mixing) but also far more physical effects such as offset of colorant onto the backs of neighboring printed sheets—or even cockle (puckering of the printing medium itself), and blocking (sticking to such adjacent pages).

By laying down in each pass of the printhead just a fraction of the total colorant required in each section of the image—so that any areas left white in each pass can be filled in by one or more later passes—printmasking reduces the amount of liquid that is all on the page at any given time. Results include a reasonable degree of control of bleed, blocking and cockle, and sometimes shorter drying time.

The specific partial-inking pattern employed in each pass, and the way in which these different patterns add up to a single fully inked image, is known as a "print mode". An earlier generation of printmasks unfortunately contained regular internal repetitions, such as square or rectangular checkerboard-like patterns.

Those regular repetitions tended to create objectionable moire effects when frequencies or harmonics generated within the patterns were close to the frequencies or harmonics of interacting subsystems. Hence it is very appropriate that more-recent efforts have focused upon the internal randomization of printmasks.

As the second of its two primary functions mentioned above, printmasking is also exploited in conjunction with plural passes over each region of the printing medium to hide the edges of swaths created by the scanning printheads. To avoid such problems of horizontal banding, a print mode may be constructed so that the medium advances between each initial-swath scan of the pen and the corresponding fill-swath scan or scans.

In fact this can be done in such a way that each pen scan functions in part as an initial-swath scan (for one portion of the printing medium) and in part as a fill-swath scan. This technique tends to distribute rather than accumulate print-mechanism error that is otherwise impossible or expensive to reduce.

The previously mentioned Cleveland patents discuss at length the use of space- and sweep-rotated printmode masks. In these techniques, a printmask is bodily shifted with respect to the printhead—in such a way that the head, in its successive passes across the print medium, addresses sub-arrays of dots that fit neatly in among one another to eventually account for all the pixels in the image.

Cleveland also points out that operating parameters can be selected in such a way that, in effect, rotation occurs even though the pen pattern is consistent over the whole pen array and is never changed between passes. Figuratively speaking this can be regarded as "automatic" rotation or simply "autorotation".

In addition Cleveland taught that steeply angled printmask patterns of separated lines could be used to mitigate problems of arch-shaped artifacts in the top and bottom zones of a page. In those zones there is no print-medium advance between printhead scans, and the medium is not held in tension effectively.

All of these several techniques, however, suffered from the previously mentioned problems of internal regularity within each mask itself. Recognition of these problems has led to intensive effort toward randomization within the patterns.

Most recently such efforts have grappled with the realization that the more random (as distinguished from homogeneous) a pattern is internally, the more distinctive and even bizarre it may appear when stepped dozens of times across and down a page. As explained above in the context of dither masks, visible patterns develop through repetitive recurrence of particular dot-placement errors (DPEs) registered in the same positions of a particular dither mask. It will be shown below that the means by which that dither-mask pattern "expresses itself" through the particular DPEs is in fact the printmask.

In a midtone field the unique characteristics of the printhead DPE and the two masks, all considered together, produce unique and sometimes surreal shapes—tiled throughout the subject area. Accordingly, most-recent work has confronted the need to provide randomization over areas much larger than the printmask patterns themselves.

Garcia, in particular, has discovered that the human eye is sensitive to pattern repetition within only a relatively narrow range of spatial frequencies. Garcia accordingly teaches that printmask size need not cover an entire image, to eliminate apparent patterns effectively, but rather need only be wide and tall enough to fall outside that range of sensitivity.

Garcia's sweeping innovations also teach how to make a printmask essentially as large as desired, and how to introduce into it precisely an ideal degree of randomness. They further explain how to accomplish these several tasks while committing minimal printmask memory to the effort.

Doron, in contrast, applies a relatively modest methodology to randomization, somewhat akin to Askeland's in the dither-mask regime. Doron evidently provides plural printmasks, each relatively small, for each image.

He prescribes run-time random selection of one mask for use in each printing operation—that is, for each printer pass in a repeating series of, say, four or five passes. The printer selects a different one of the masks for each pass, which is to say that different masks are applied to printing of different image portions.

Doron appears to introduce randomness at two stages of his procedures. First, in the mask-building stage his procedure operates in a three-dimensional space that is a vertical stack of pixel grids, each successive grid or plane representing a higher layer of inkdrops applied in succeeding passes, or by later-arriving nozzles in a single pass.

He randomly selects a series of vertical columns in the stack—e.g., columns that underlie particular pixel positions in the topmost grid—for processing, one column at a time. In processing each column he fills-in printing parameters for the several grids in the stack, observing selection rules that refer to columns which have been previously filled in.

The selection rules appear to result in an essentially deterministic series of selected "parameter" numbers down the column, given the columns filled in previously. In this way the random order of column selections controls the final overall three-dimensional array of parameters.

Second, of Doron's two introductions of randomness, his control program at run time randomly selects one of a number of the randomly generated masks for use in each "printing operation" as mentioned above. The degree of randomness in his pseudorandom system appears to be fixed by these two processes.

Although it uses plural masks in conjunction for printing of each image, his system appears to require relatively modest quantities of data storage. It requires more than just the storage for one mask, but less than would be required for permanent storage of all necessary masks (since his printer builds its own masks in the field), and a small amount in total because each of his masks is rather small.

For its efficacy the system attempts to rely upon continuously shifting among several available masks to break up patterning, but the individual masks are small. Doron's mask height (i.e. parallel to the print-medium advance direction in the pixel grid) is his pen height, preferably one hundred twenty-eight pixels; however, his most-highly preferred mask width is said to be only thirty-two pixels.

Thus if the number of masks is also rather small, some potential for repetitive patterns breaking through may remain. On the other hand if the number of masks is adequately large and the selection truly randomized, then the system may exhibit adverse effects of highly random masking—as pointed out and explained in the previously mentioned Garcia document.

Doron does not address the issue of optimizing the degree of randomness in his systems. Nonetheless Doron's methods appear to represent a significant improvement, and are very promising.

For present purposes it bears mention that the dimensions—in pixels—of printmasks are essentially always powers of two. This is no coincidence but rather arises from the pervasive use of binary devices noted earlier in discussion of dither masks.

(d) Other interactions—The present invention proceeds from recognition of another fact about graininess and patterning. Since that realization is associated with the invention, it will be reserved for the following section of this document.

(e) Conclusion—Although great strides have been made in understanding and managing the above-noted sources of undesired patterning and banding artifacts, at least one such source remains and is introduced below. All of such error sources continue to impede achievement of uniformly excellent incremental printing—at high throughput—on all industrially important printing media. Thus important aspects of the technology used in the field of the invention remain amenable to useful refinement.

SUMMARY OF THE DISCLOSURE

The present invention introduces such refinement. Before offering a relatively formal discussion or description of preferred embodiments of the invention, a preliminary orientation will be offered. It should be understood that this informal introduction is not a statement of the invention as such.

As explained above, some recent work has focused on banding and patterning due to stepped internal (though random) patterns of dither masks; and other prior work has focused on banding and patterning due to stepped internal (though random) patterns of printmasks. What evidently has not been addressed heretofore is the interaction between the dither masks and the printmasks.

The present invention focuses upon that interaction. Interaction between the two kinds of masks is important because the sizing of both types is determined for data-handling and program-management efficiency and convenience. These considerations, as pointed out earlier, favor data blocks that are in binary sizes—i.e. blocks whose sizes in bytes are multiples of two, and preferably powers of two.

As a result ordinarily the width 101 (FIG. 2) of the printmask 102 fits an integral number of times across the width 103 of the dither mask 104. More specifically, for the illustrated example, that integral number of times (right-hand view of the diagram) is four. Conversely, the height 105 of the dither mask 104 fits an integral number of times—namely, two times—down the height 106 of the printmask 102.

Therefore repetitive effects developing in either mask are also seen in the other mask. As a result, any perceptible pattern that develops in printing with—in particular—a dither mask 104 is simply passed through the system by the printmask 102.

Perceptible patterning can be seen in a simulated midtone printout (FIG. 1) using these masks. As predicted by the right-hand view of FIG. 2, the repetitive units of the pattern are vertically adjacent pairs of the square dither-mask units—outlined in a white overlay grid.

More specifically, as noted earlier a directional error in a single nozzle translates into a dot-placement problem for certain pixels of the dither matrix. Initially it is the printmask, not the dither mask, that determines which nozzles will print any specified image dot (or dither-mask pixel)—but the printmasks are consistently aligned with the dither mask.

This is the key to the patterning. Because of the interfitting of the dither masks with the printmasks, any specified dither-mask pixel is always printed by a certain specific nozzle—or at most a small number of such nozzles—and the resulting dot is therefore always displaced in the same way.

A like analysis applies to other kinds of nozzle idiosyncrasies, including inkdrop size, velocity, special tendency to develop a secondary drop or tail, etc. Each such peculiarity contributes to a unique signature for each nozzle.

The unevenness-generating DPE problem is thus applied consistently and repetitively across the tonal area, producing the patterning described above. Aggravating this is the fact that both dither masks and printmasks are often small, making the repetition periodicity very noticeable to human vision.

It was previously promised to demonstrate just how the dither-mask pattern could express itself through a particular printhead DPE pattern to produce patterns on the print medium. It was also proposed that the means for such expression are in fact the printmask.

Now that the demonstration is complete, the reader can appreciate that it depends upon repeating, consistent registration between the two kinds of masks. Therefore these effects can be broken up to a large extent merely by eliminating the consistency of registration between the two kinds of masks.

This can be accomplished by forcing the two kinds of masks to be of different sizes—or to behave as if they are—as fully explained below. The invention further reveals that this can be achieved without deviating from the preference for multiples of two in data handling and program management.

What is more, the invention teaches that registration between the two masks can be made inconsistent even without disturbing preprogrammed algorithms and hardware, provided only that access to the printmasks (or dither masks) is permitted. Now, with these informal comments in mind, the discussion will turn to a more rigorous presentation of the invention.

In its preferred embodiments, the present invention has several aspects or facets that can be used independently, although they are preferably employed together to optimize their benefits.

In preferred embodiments of a first of its facets or aspects, the invention is apparatus for printing a desired image on a printing medium. It operates by construction from individual marks formed in a pixel array.

The apparatus includes some means for establishing a dither mask having a dimension—i.e., ordinarily either a width or a length. For purposes of breadth and generality in discussing the present invention, these means will be called simply the "dither-mask establishing means".

Also included in the apparatus are some means for establishing a printmask having a corresponding dimension that is neither a factor nor an integral multiple of the dither-mask dimension. These means, also for generality and breadth, will be called the "printmask establishing means".

By the phrase "corresponding dimension" of the printmask is meant a dimension that corresponds to the previously mentioned dimension of the dither mask. More specifically, if the dimension of the dither mask is a width, then the printmask "corresponding dimension" also is a width—or if the dither-mask dimension is a length then the printmask corresponding dimension likewise is a length.

By "integral multiple of the dither-mask dimension" is meant a value that results from multiplying (1) the dither-mask dimension by (2) a factor that is an integer. If the dither-mask dimension is expressed in terms of pixels, ordinarily that dither-mask dimension too is an integer; hence the resulting product, as well, is an integer.

In addition the apparatus includes some means for using the dither mask to render the image and using the printmask to print the rendered image. These means, again for breadth and generality, will be called the "using means".

The foregoing may constitute a description or definition of the first facet of the invention in its broadest or most general form. Even in this general form, however, it can be seen that this aspect of the invention significantly mitigates the difficulties left unresolved in the art.

In particular, the dither mask and printmask of this facet of the invention are distanced from one another in terms of the relationship between their corresponding dimensions. Any resulting patterning that results from the mask interactions can thereby be forced to have a long spatial periodicity.

As explained in a later section of this document, the period is easily controlled, and is readily made much longer than the spatial wavelengths to which the human visual system is sensitive. As a result the patterning, though present in principle, is very inconspicuous (at least to people!) in practice.

Although this aspect of the invention in its broad form thus represents a significant advance in the art, it is preferably practiced in conjunction with certain other features or characteristics that further enhance enjoyment of overall benefits.

For example, as mentioned earlier the dither-mask dimension and printmask dimensions may both be widths, or may be heights. It is more preferable to establish the stated relationships for both widths and heights.

It is also preferred that the dither-mask dimension and the corresponding printmask dimension differ by at least three pixels. (Such a constraint appears helpful to step the patterning away from very fine features of the image itself—and thereby prevent the appearance of repetition.)

Another preference is that the dither-mask dimension and the corresponding printmask dimension differ by a multiple of two pixels. This constraint is not so much directed to image quality as to maintaining optimum compatibility of the invention with easy programming—and efficient use of memories and microprocessor operation.

Accordingly it is still more preferable that the dither-mask dimension and its corresponding printmask dimension differ by eight pixels or a multiple of eight pixels. In one particularly advantageous preference following this approach, one of the two mask dimensions is a multiple of 256 pixels and the other differs from that dimension by a multiple of eight pixels.

For multipliers of unity, as an example, if one dimension is 1×256=256 pixels and the other differs from it by 1×8=8 pixels, then that "other" dimension is 256±8 pixels—i.e., is either 264 or 248 pixels respectively. The two multipliers need not be the same: for another example using multipliers of four and two, if one dimension is 4×256=1,024 pixels and the other dimension differs from this by 2×8=16 pixels, then that other dimension is 1,025±16=1,009 or 1,041 pixels.

The apparatus may be one that prints the image in plural colors, the marks being made with respective plural colorants. If so, preferably its several components are in essence replicated for each colorant independently.

Yet another preference, for use with the first major aspect of the invention as defined above, is for use if the apparatus has a scanning printhead that makes multiple passes across the printing medium. According to this preference the printing apparatus includes some means for establishing an offset that is smaller than at least one of said dither-mask and printmask dimensions.

It also includes some means for indexing one of the dither mask and printmask by that offset, between passes of the scanning printhead. The term "indexing" in this document refers to stepping or shifting of a mask internally. As will be explained below, this feature provides an alternative way of achieving long periodicities.

This preference—as a preferred mode of operation of the first major aspect of the invention—most typically is useful if applied along a dimension orthogonal to the dimension in which the first major aspect of the invention operates. In other words, the "nonmultiple" system can be used in one direction, while this alternative "offset" system can be used in a direction at right angles to that one direction.

In preferred aspects of a second of its aspects, the invention is apparatus for printing a desired image on a printing medium, by construction from individual marks formed in a pixel column-and-row array. This apparatus includes a scanning printhead that makes multiple passes across the printing medium.

It also includes some means for establishing a dither mask having a dimension, and some means for establishing a printmask with a corresponding dimension. For this second aspect, however, it is not necessary to impose a nonmultiple/nonfactor constraint such as used in the first facet of the invention.

Instead this aspect of the invention includes some means for establishing an offset that is smaller than at least one of the dither-mask and printmask dimensions—and also some means for indexing one of the dither mask and printmask by that offset, between passes of the scanning printhead. In other words, either the dither mask or the printmask is internally stepped or shifted. It is within the scope of the invention to index both—but preferably not in such a way as to keep them consistently registered, since an object of the invention is to minimize consistent registration. Although "indexing" does not itself entail moving the mask envelope relative to the printing medium or relative to the printhead, naturally the mask envelope may also be displaced in a conventional fashion between printhead scans.)

In addition, this aspect of the invention includes some means for using the dither mask to render the image and using the printmask in controlling the printhead to print the rendered image.

This second aspect of the invention may be recognized as using essentially the same principle as the last-mentioned preference described above for the first aspect. This offset system can thus be used for one or both orthogonal dimensions in a rectangular-pixel-grid printer.

The foregoing may constitute a description or definition of the second facet of the invention in its broadest or most general form. Even in this general form, however, it can be seen that this aspect of the invention too significantly mitigates the difficulties left unresolved in the art.

In particular, this aspect of the invention is an unusually powerful tool for obtaining the same advantages provided by the first aspect—but when the nonmultiple/nonfactor constraint is unavailable or uneconomic, or for some other reason undesirable.

Although this second aspect of the invention in its broad form thus represents a significant advance in the art, it is preferably practiced in conjunction with certain other features or characteristics that further enhance enjoyment of overall benefits.

For example, this aspect of the invention is particularly useful if the dither-mask establishing means and the printmask-establishing means include one or more preprogrammed circuits or algorithms for implementing the dither mask and printmask. Here it is to be assumed that the printmask corresponding dimension is an integral multiple or an integral factor of the dither-mask dimension, and furthermore that the preprogrammed circuit is incapable of effectuating small changes in either of those dimensions—or the preprogrammed algorithm is incapable of effectuating such changes efficiently.

In such cases it is typically very undesirable to reprogram the entire circuit or algorithm to introduce a major new strategy (such as the first aspect of the present invention), because of the associated costs and time required to thoroughly debug the revised code. These benefits are particularly powerful in the case of a preprogrammed application-specific integrated circuit (ASIC), because redesign of an ASIC is so monumentally expensive, time consuming and risky.

The second aspect of the invention can avoid all such costs, delays and risk if the system simply permits independent access to the contents of the printmask or dither mask in each pass. Such access is available in some systems, without revision of the algorithmic code, for the very reason that mask variations have often become desirable after completion of the code.

Thus the second aspect of the invention is particularly effective if the preprogrammed circuit is incapable of effectuating any change in either of the dimensions. This is the characteristic most likely to be present if the preprogrammed circuit is an ASIC.

For the second main aspect of the invention, as for the first, the question arises how to construct the apparatus if the apparatus prints in plural colors. Preferably the several components discussed here are replicated for each of the colors respectively.

In preferred embodiments of a third of its basic aspects or facets, the invention is a method of printing desired images on a printing medium The method operates by constructing the images from individual marks formed in a pixel column-and-row array by a scanning multiple-nozzle pen, which operates in conjunction with a printing-medium advance mechanism.

The method includes the step of establishing and operating a rendition stage that includes using a dither mask which has a dimension. It also includes the step of establishing and operating a printmasking stage that includes using a printmask. The printmask has a dimension which is an integral multiple or an integral factor of the dither-mask dimension.

The dither mask and printmask dimensions have an interaction that establishes a spatial periodicity which is well within a range to which human vision is sensitive. In addition, the method includes the step of extending the spatial periodicity of the interaction between the dimensions—specifically, extending the periodicity to a value well outside that sensitive range.

The foregoing may represent a description of definition of the third aspect or facet of my invention in its broadest or most general form. Even as couched in these broad terms, however, it can be seen that this facet of the invention importantly advances the art.

In particular, this aspect of the invention has generally the same advantages as those noted above for the second facet. This third aspect, however, is not necessarily limited to the particular small-offset methodology.

Although this method even as thus broadly couched serves an excellent purpose, nevertheless preferably it is performed with certain additional features or characteristics. For instance, preferably the extending step includes causing at least one of the mask dimensions to be effectively larger, in regard to its interaction with the other of the mask dimensions.

Further along these lines, still more preferably the causing step comprises effectively enlarging said at least one of the mask dimensions by a factor of at least two. A particularly strong preference is that the factor be at least eight.

Another preference is that the causing step include indexing the "at least one" of the masks by an offset that is less than half of that mask dimension. In this case the factor is equal to the ratio of (1) the at least one of the mask dimensions and (2) the offset.

A further specific desirable characteristic—for this indexing form of the third aspect of the invention—is that the causing step cause the spatial periodicity to be equal to the minimum common multiple of (1) that same one of the mask dimensions, as thus effectively enlarged, and (2) the other of the mask dimensions.

Once again for this third facet of the invention, a further consideration comes into play if the images are to be printed in plural colors. Preferably the method is applied independently for each of the colors respectively.

All of the foregoing operational principles and advantages of the present invention will be more fully appreciated upon consideration of the following detailed description, with reference to the appended drawings, of which:

BRIEF DESCRIPTION OF THE DRAWINGS

FIG. 3 is a diagram like the left-hand view of FIG. 2, showing relationships between one printmask and one dither mask according to the present invention;

FIG. 4 is a view like the right-hand view of FIG. 2, showing how the two FIG. 3 masks fail to interfit as in FIG. 2 but instead form an expanding pattern that requires four to eight steps of the individual FIG. 3 masks to complete an interaction cell;

DETAILED DESCRIPTION OF THE PREFERRED EMBODIMENTS

1. Geometrical Relationships Between Masks

In addition to the insights underlying the present invention as stated at the beginning of the earlier "summary" section, philosophically the invention takes a novel approach to the solution. Earlier masking such as summarized in Cleveland's discussions was completely determinative. More-recent masking innovations have swung toward an opposite approach of controlled degrees of both internal and external randomization.

The present invention returns to a determinative or systematic strategy, but only with respect to what is external to the individual masks. The invention reveals that the repetitive effects of printmask and dither-mask interaction can be deferred by very greatly extending the periodicity of their interaction—systematically, with no need for randomness.

Figure 1:
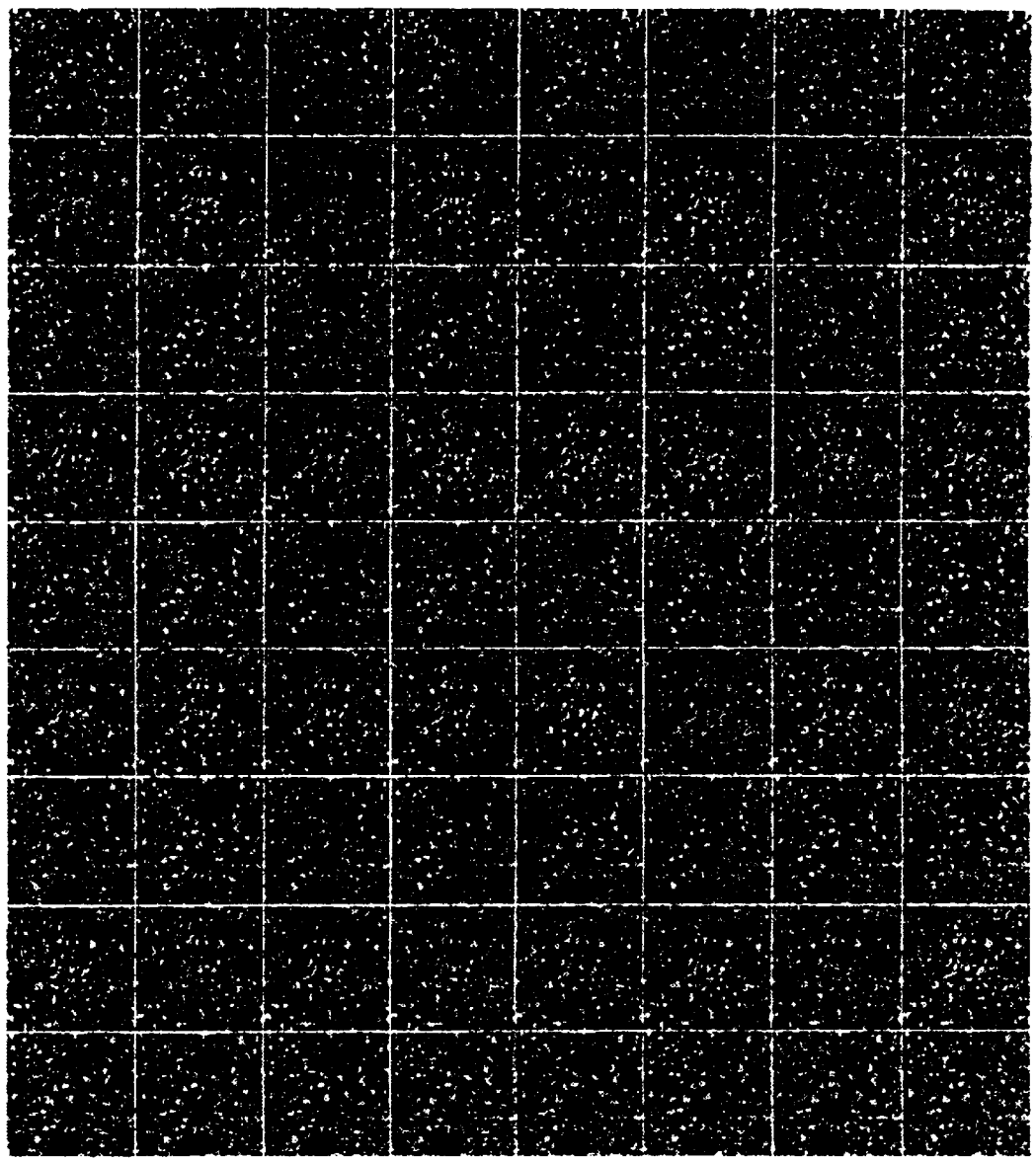
FIG. 1 is a simulated midtonal rendition made with prior-art dither masks and printmasks.
Figure 2:
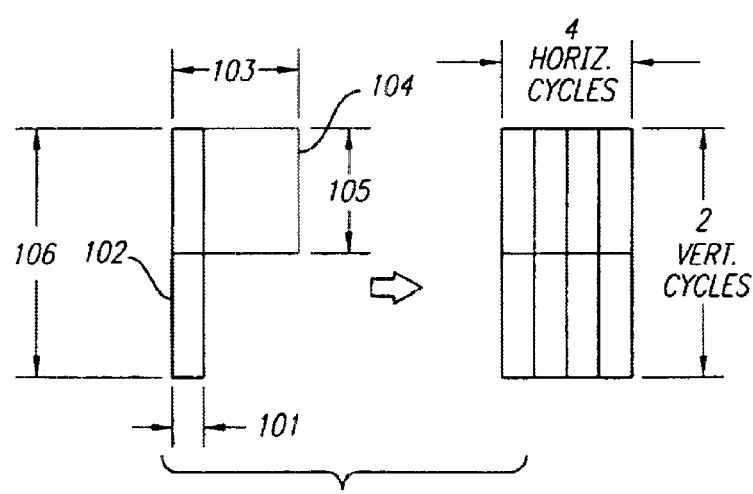
FIG. 2 is a diagram showing relationships between a printmask and dither mask according to the prior art, such as can produce the rendition of FIG. 1—the left-hand view showing one of each of the masks, and the right-hand view showing how the two masks interfit to show a relatively very small interaction cell.

In comparison with the prior-art interfitting of two masks shown in FIG. 2, the present invention provides masks that are of slightly different dimensions—or are modified during printing to perform as if they were of slightly different dimensions.

Thus the width 201 (FIG. 3) of the new printmask 202 no longer fits integrally across the width 203 of the new dither mask 204; in fact, for the illustrated example the printmask 202 is now some 25% wider than the dither mask 204. (For readier comparison of this example with that given for the prior art in FIG. 2, the dither mask here is the same size—and the printmask the same height—as in the prior-art illustration.)

The result, for widths, is that—in the particular example illustrated—five horizontal cycles 221 (FIG. 4) of the dither mask 204 are required to catch up to four horizontal cycles 222 of the printmask 202. Patterning across a simulated midtonal printout (FIG. 5) is accordingly very greatly diminished.

This technique does not abandon the operational advantages of binary-sized data blocks. The width differential 207 between the two masks is, in the example illustrated, one-quarter of the dither-mask width 203; hence the width 201 in pixels across the new printmask 202 is still a multiple (though not a power) of two.

For instance, for a new dither-mask width 203 of two hundred fifty-six ($2^8$) pixels, written "10000000" in binary notation, the new printmask width 201 exceeds that dither-mask width by one-quarter, which amounts to a distance 207 that is sixty-four ($2^6$) pixels. Thus the width of the new printmask is three hundred two ($2^8$–$2^6$) pixels, written in binary "10100000". Data blocks of this size are perhaps not as convenient as the prior-art block of binary "10000000" pixels, but still readily tractable.

A comparable advantage can be gained by applying the same technique in the vertical direction. For the vertical relationships in the illustrated example, however, a different facet of the invention has been applied.

Here the height 205 of the new dither mask 204 still does fit an integral number of times (namely twice) down the height 206 of the new printmask 202. To overcome this, however, the printmask is indexed by a horizontal offset 208.

In other words, the internal pattern of the printmask is moved toward the left by a certain band 208 of pixels, so that the mask outline itself appears in the illustration to be shifted toward the right. To understand that the internal pattern is shifted leftward, it may be noted that:

in the top row 211 of printmask tiles, what appears at the left margin of the entire illustrated interaction cell 209 is the left margin 212 (FIG. 3) of the individual printmask 202;

however:

in the second row 213, what appears at the left margin of the entire cell 209 is instead the right-hand band of pixels 214 within the printmask 202.

Thus in the second row 213, the left margin 212' of the printmask 202 does not begin until after that right-hand pixel band has been passed.

As a result, eight vertical cycles (FIG. 4) of the new dither mask 204, rather than only two, are needed to catch up with four vertical cycles of the new printmask 202. The horizontal relations described above are unchanged: in the second through fourth ranks of the diagram, five cycles of the dither mask still match four cycles of the printmask, even though the latter appears offset progressively rightward in those lower ranks.

Those skilled in this field will understand that an analogous result can be obtained by internal indexing of the printmask 202 vertically, instead of horizontally. Furthermore, in principle this same technique can be used in place of the first-introduced actual size mismatch for the horizontal interaction between the two masks.

2. Mathematical Relationships

Both the size differential 207 and the offset 208 in the accompanying illustration have been chosen to enable a clear showing of the full interaction cell 209. For this purpose the size differential 207 and offset 208 are each one-quarter of the dither-mask width 203.

Choosing such a large fraction, however, actually leads to a rather modest extension of the interaction periodicity—i.e., only five times the dither-mask width and four times the printmask width. In practice a preferred fraction is one-eighth (still leading to a binary-sized new mask width, of binary 10001000) or even one-sixteenth (e.g., printmask width of binary 10000100).

Figure 5:
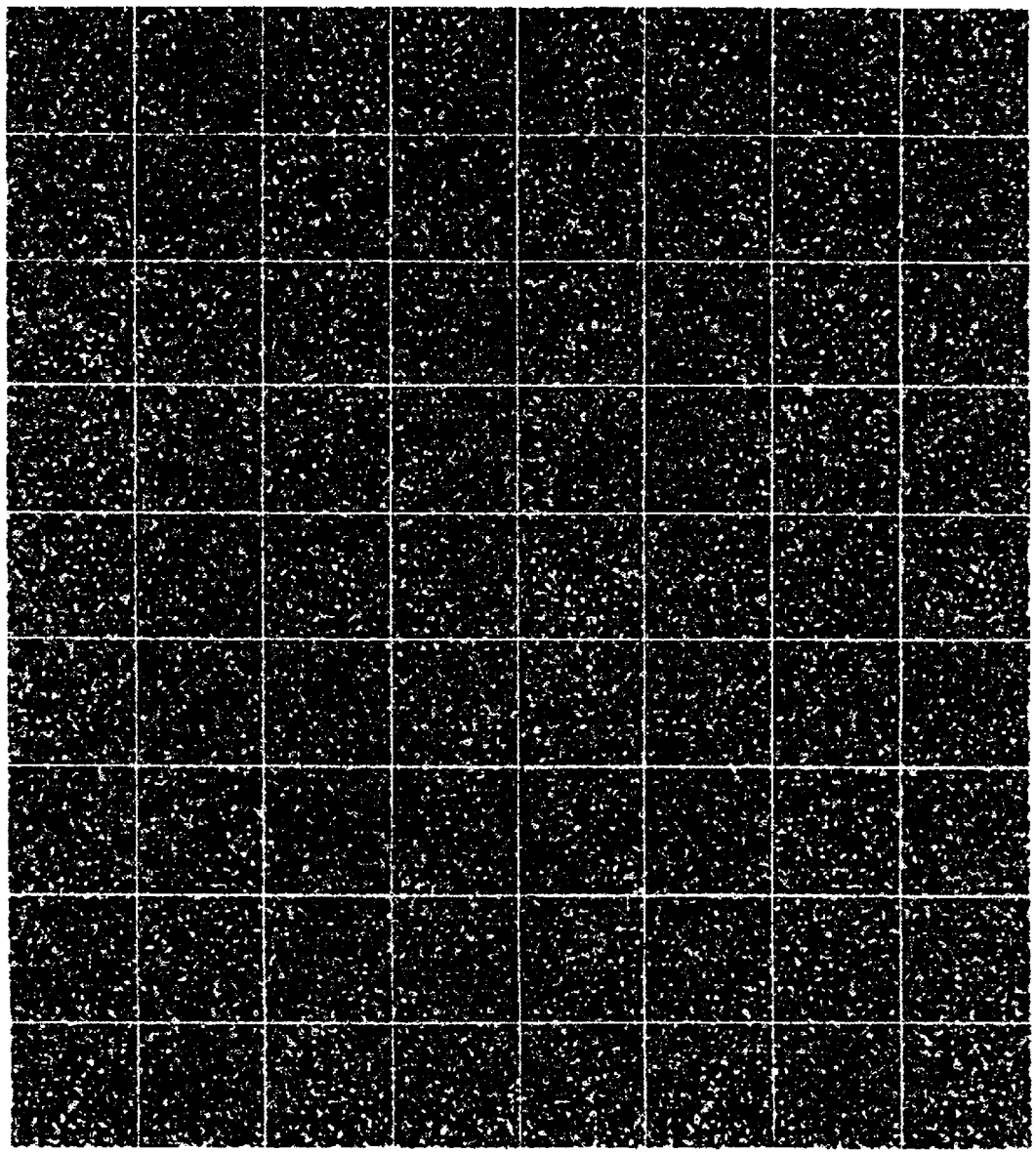
FIG. 5 is a simulation like FIG. 1 but made with the masks of FIG. 3.

Interaction periodicity in these cases is correspondingly two to four times longer than what is shown (FIG. 4), and the disintegration of patterning effects correspondingly more effective than that illustrated (FIG. 5).

When the two mask types are of different sizes, the periodicity of repetition associated with stepping of each mask is correspondingly different. The interaction between the two kinds of masks remains repetitive, but the cycle or periodicity of repetition of the interaction is very long.

The basis for this is analogous to the familiar phenomena of beats, in acoustic, optical or electronic oscillations—or again moire patterns in visible effects. It is very well known in all such phenomena that the frequency of the beats is the difference between the frequencies of the individual oscillations.

Thus in the present case the spatial frequency of the interaction between dither masks and printmasks can be made equal to the difference between the respective spatial frequencies of the two masks. Put another way, in wavelength terms the reciprocal of the vertical interaction periodicity is equal to the difference between the reciprocals of the mask lengths (heights)—

$$\frac{1}{\text{interaction period}} = \frac{1}{\text{dither-mask dimension}} - \frac{1}{\text{printmask dimension}}.$$

This difference can be made very large, simply by making the mask lengths very close to each other. It is only required that they not be integral multiples or factors of one another, as they have been almost universally heretofore.

Like relations hold for the horizontal period and the mask widths. These two relations operate independently, so the repetition can be controlled to different interaction periodicities for length and width, or a common interaction periodicity, as preferred.

In mathematical terms, the extended geometry discussed above results from choosing a printmask and dither mask neither of which is an integral multiple of the other. Alternatively stated, each mask is neither a factor nor an integral multiple of the other.

This causes the nozzles assigned to print each dot of the dither matrix to change each time that matrix is used in printing, until a cycle is completed and the nozzles match the dots again. The length of that cycle is the minimum common multiple of the corresponding dimensions of the two matrices, a condition that can be derived from the mathematical expression presented above:

$$\frac{1}{\text{interaction period}} = \frac{(\text{printmask dimension}) - (\text{dither-mask dimension})}{(\text{printmask dimension}) \cdot (\text{dither-mask dimension})};$$

so that—

$$\text{interaction period} = \frac{(\text{printmask dimension}) \cdot (\text{dither-mask dimension})}{(\text{printmask dimension}) - (\text{dither-mask dimension})}$$

$$= \frac{(\text{printmask dimension}) \cdot (\text{dither-mask dimension})}{\text{dimension differential}}.$$

and this last expression is the minimum common multiple of the two mask lengths.

In the earlier example of a 256-pixel-square dither matrix, choosing a printmask eight pixels wider, at two hundred sixty-four pixels, leads to a repeating cycle that is 8,448 pixel columns wide. This number can be seen as representing the dither-mask width times an extension factor equal to the printmask width expressed in units of the width differential.

The extension factor, in other words, is one-eighth of the printmask width, or 264/8=32. The 8,448-pixel cycle is thirty-two TIMES as wide as the dither-mask width.

With mask widths of five hundred twelve and five hundred twenty pixels respectively, the extension factor is 520/8=65, and the overall interaction cell therefore 512× 65=33,280 pixels. For a 24-pixel-per-mm grid, very remarkably this interaction cell is more than 1⅓ m (4½ feet) wide.

As noted earlier, printmasks often are accessible for internal modification even in systems whose algorithms are cast in silicon. Hence the type of modification described above is amenable to insertion into an already complete printing regimen, particularly with respect to printmask width—that is to say, the horizontal or scan-axis dimension. Even in a product development that is not thus constrained the invention may yet be of great value since it minimizes the amount of firmware or hardware (ASIC elements) required to avoid patterning along the scan axis.

As to the vertical or printing-medium advance axis, however, actual expansion of the printmask height may implicate changes in printing-medium advance length as well, and this parameter may not be accessible for modification. Particularly for such situations the differential technique may be unavailable for the vertical dimension, but the offset strategy can yet serve.

As to this methodology let it be supposed again that the printmask swath height, measured in pixels, is two hundred fifty-six—or a multiple of that value. Assigning particular nozzle dot-placement errors consistently to the same pixels of the dither matrix, swath after swath, is a potential source of patterning as explained earlier.

To avoid that consistent assignment the mask is internally indexed either horizontally (FIG. 4) or vertically (not shown), after printing of each swath. The indexing is by an offset distance that is preferably a power of two—once again to maintain the benefits of such values in data-block management.

As an example, the offset may be $2^5=32$ pixel rows, which distance is one-eighth of the dither-matrix height. Even for this rather large offset, the cycle repetition period will be 2,048 rows or nearly 9 cm (3⅓ inches).

Calculation of the overall period for this aspect of the invention follows generally the principles outlined above, but with the difference that the printmask height is in effect multiplied by a factor equal to that same height divided by the offset. In other words, the effective height of the printmask is expanded by the factor—

$$\frac{\text{printmask height}}{\text{offset}}.$$

Consequently the effective height of the printmask becomes:

$$\frac{\text{effective}}{\text{printmask height}} = (\text{printmask height}) \cdot \frac{\text{printmask height}}{\text{offset}},$$

and the interaction-cell spatial frequency is then found as the minimum common multiple of this value and the dither-mask width.

Since the effective printmask height given by the above expression is $256^2/32$ and the dither-mask dimension is 256 pixels, the latter number is a factor of the former and need not be considered in determining the minimum common multiple. Thus the answer is 2,048 pixels as stated above.

Considering another example, 512-pixel-square printmask and dither mask with an eight-pixel offset, the effective printmask dimension is $512^2/8$—which is also the minimum common multiple. The answer here is the same dimension found for the horizontal case considered above, namely more than 1⅓ m (4½ feet). This is larger than the entire printout for all but poster-size and larger images.

When the interaction period is modest, even as extended, this invention may be said to build upon the discoveries by Garcia relating to spatial-frequency sensitivity of the eye. As pointed out above, however, the periodicity extension achievable with the present invention can be made extremely long—so long in fact as to cover substantially an entire image, at least for relatively large masks and relatively modest image sizes. In that case there is physically no repetition, and the invention need not invoke the Garcia spatial-frequency principle.

3. Basic Hardware for Implementation of the Invention

Figure 6:
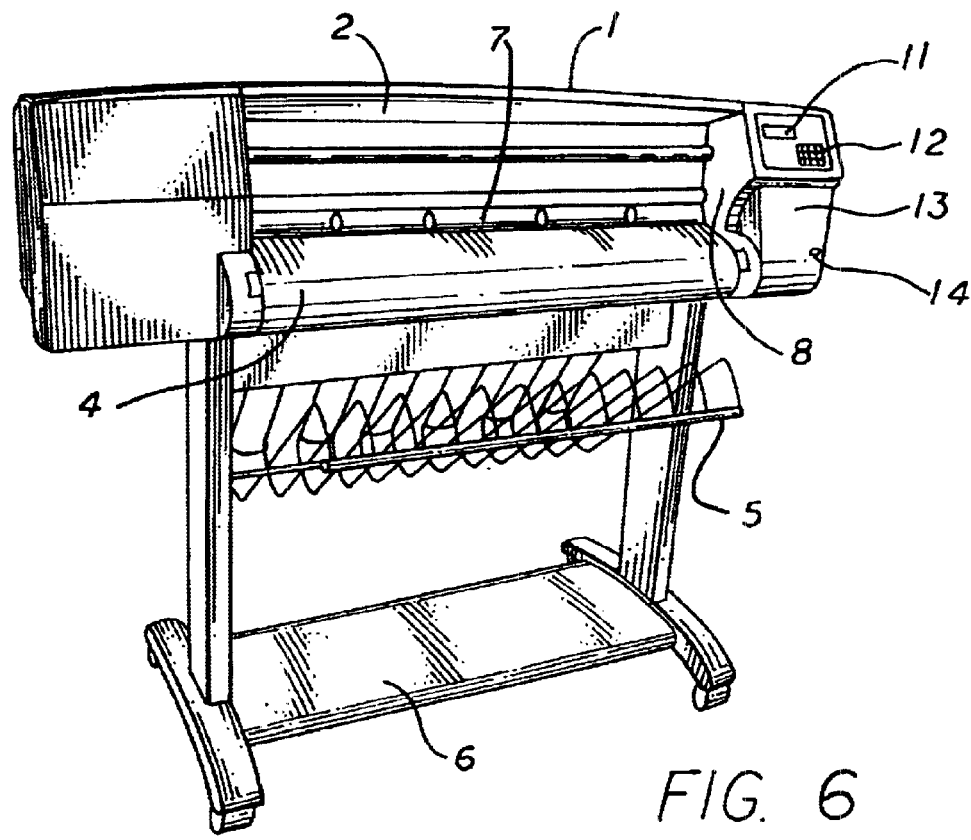
FIG. 6 is an isometric or perspective exterior view of a large-format printer-plotter which is a preferred embodiment of the present invention, and which can be used to implement the relationships of FIGS. 3 through 5.

The preferred printer/plotter includes a main case 1 (FIG. 6) with a window 2, and a left-hand pod 3 that encloses one end of the chassis. Within that pod are carriage-support and -drive mechanics and one end of the printing-medium advance mechanism, as well as a pen-refill station containing supplemental ink cartridges.

The printer/plotter also includes a printing-medium roll cover 4, and a receiving bin 5 for lengths or sheets of printing medium on which images have been formed, and which have been ejected from the machine. A bottom brace and storage shelf 6 spans the legs which support the two ends of the case 1.

Just above the print-medium cover 4 is an entry slot 7 for receipt of continuous lengths of printing medium 4. Also included are a lever 8 for control of the gripping of the print medium by the machine.

A front-panel display 11 and controls 12 are mounted in the skin of the right-hand pod 13. That pod encloses the right end of the carriage mechanics and of the medium advance mechanism, and also a printhead cleaning station. Near the bottom of the right-hand pod for readiest access is a standby switch 14.

Figure 7:
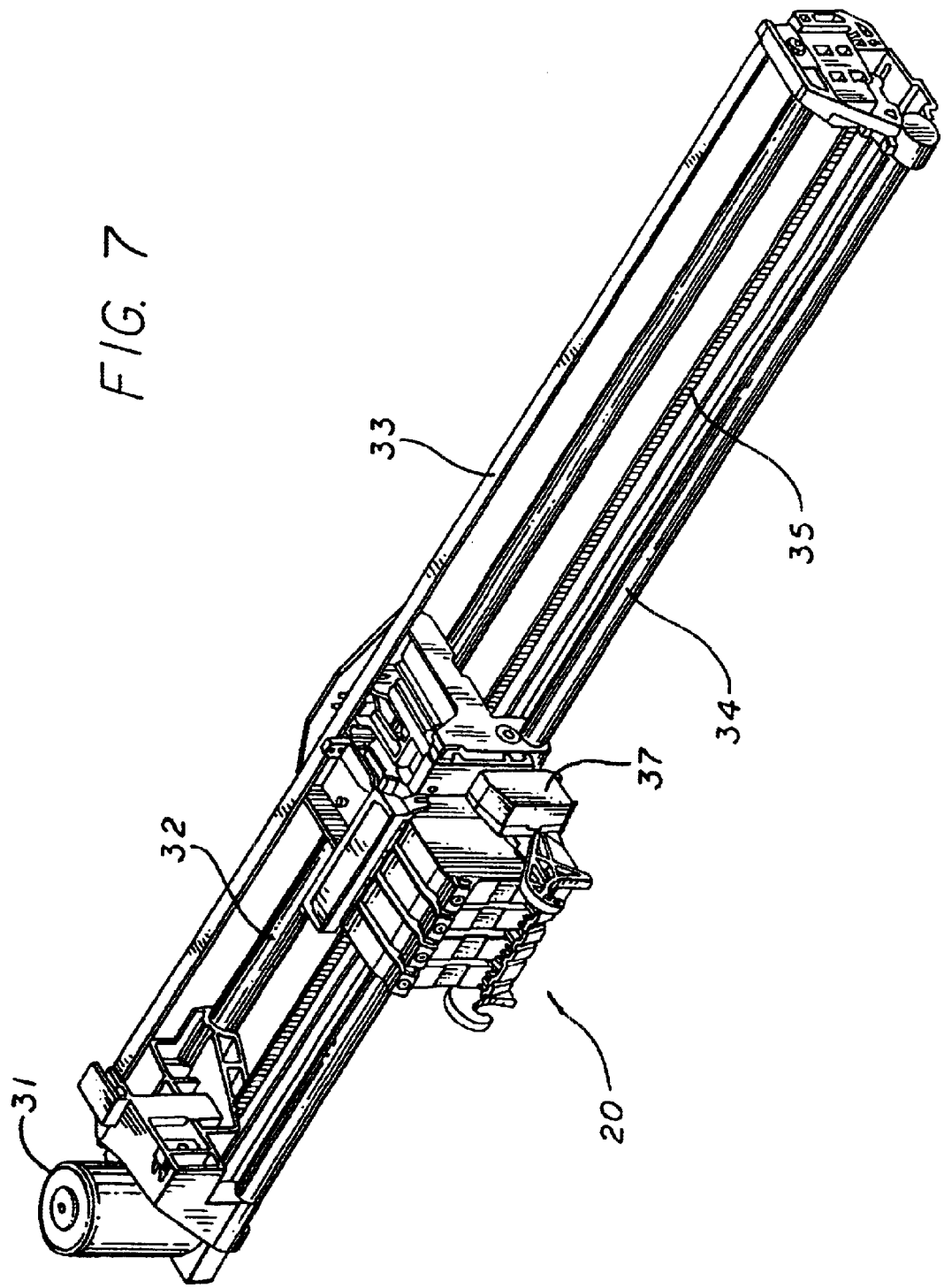
FIG. 7 is an isometric view, taken from front above left, of a carriage and carriage-drive mechanism which is mounted within the case or cover of the FIG. 6 device.

Within the case 1 and pods 3, 13 the carriage assembly 20 (FIG. 7) is driven in reciprocation by a motor 31—along dual support and guide rails 32, 34—through the intermediary of a drive belt 35. The motor 31 is under the control of signals 57 from a digital electronic microprocessor (essentially all of FIG. 11 except the print engine 50). In a block diagrammatic showing, the carriage assembly 20 travels to the right 55 and left (not shown) while discharging ink 54.

A very finely graduated encoder strip 33 is extended taut along the scanning path of the carriage assembly 20, and read by an automatic optoelectronic sensor 133, 233 to provide position and speed information 52 for the microprocessor. (in FIG. 11, signals in the print engine are flowing from left to right except the information 52 fed back from the encoder sensor 233—as indicated by the associated leftward arrow.)

The codestrip 33 thus enables formation of color inkdrops at ultrahigh resolution (typically 24 pixels/mm) and precision, during scanning of the carriage assembly 20 in each direction.

A currently preferred location for the encoder strip 33 is near the rear of the carriage tray (remote from the space into which a user's hands are inserted for servicing of the pen refill cartridges). Immediately behind the pens is another advantageous position for the strip 36 (FIG. 3). The encoder sensor 133 (for use with the encoder strip in its forward position 33) or 233 (for rearward position 36) is disposed with its optical beam passing through orifices or transparent portions of a scale formed in the strip.

Figure 8:
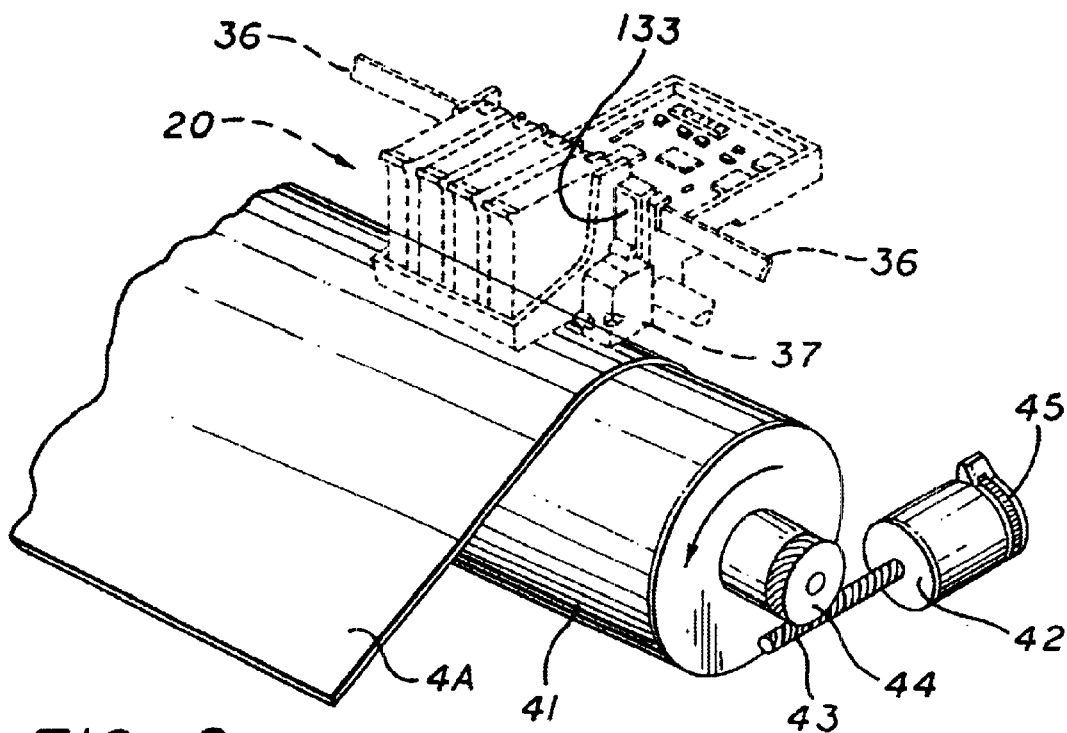
FIG. 8 is a like view of a printing-medium advance mechanism which is also mounted within the case or cover of the FIG. 6 device, in association with the carriage as indicated in the broken line in FIG. 8.

A cylindrical platen 41 (FIG. 8)—driven by a motor 42, worm 43 and worm gear 44 under control of signals 46 from the processor 15—rotates under the carriage-assembly 20 scan track to drive sheets or lengths of printing medium 4A in a medium-advance direction perpendicular to the scanning. Print medium 4A is thereby drawn out of the print-medium roll cover 4, passed under the pens on the carriage 20 to receive inkdrops 54 for formation of a desired image, and ejected into the print-medium bin 5.

Figure 9:
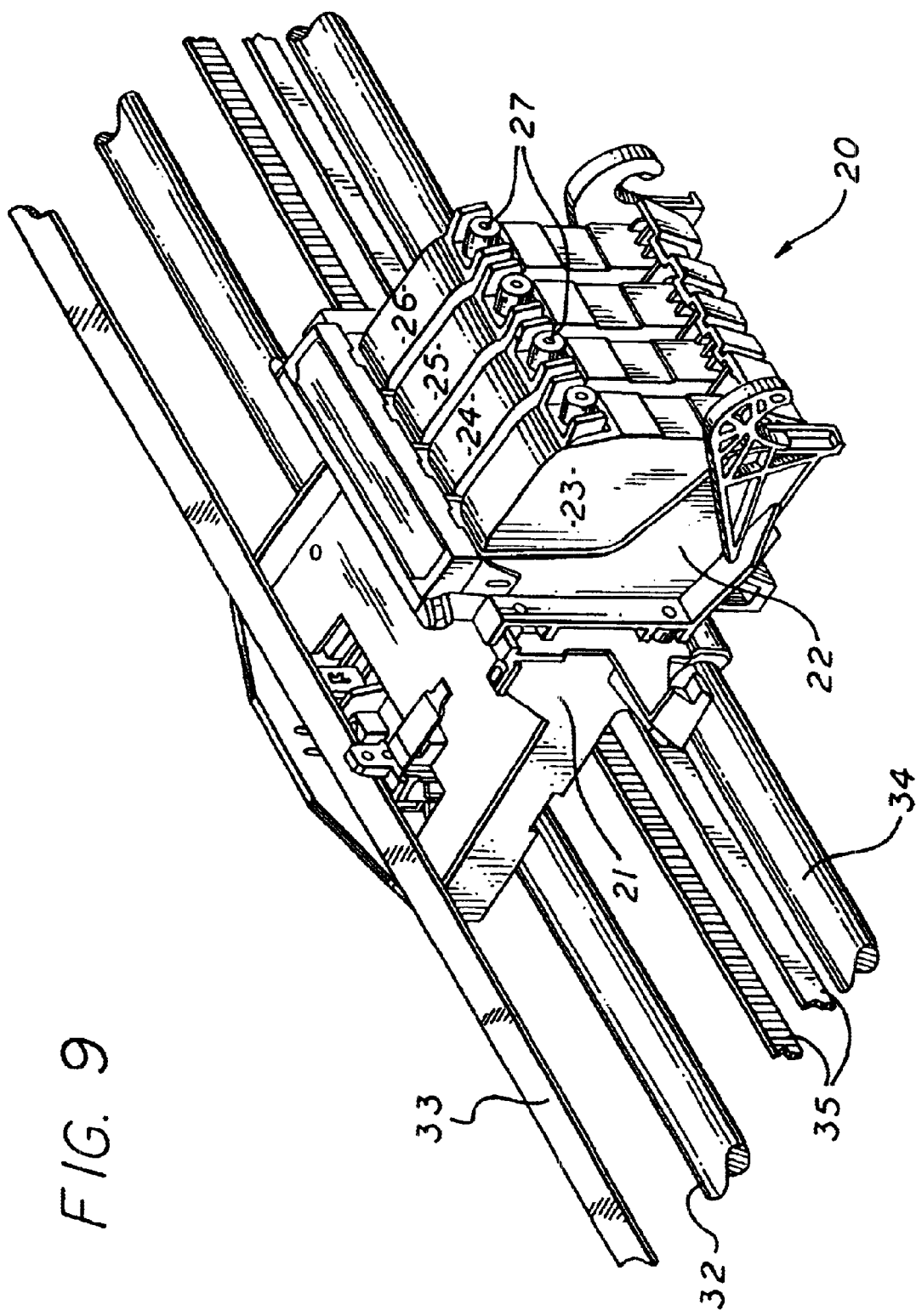
FIG. 9 is a like but more-detailed view of the FIG. 7 carriage, showing the printheads or pens which it carries.

The carriage assembly 20 includes a previously mentioned rear tray 21 (FIG. 9) carrying various electronics. It also includes bays 22 for preferably four pens 23–26 holding ink of four different colors respectively—preferably cyan in the leftmost pen 23, then magenta 24, yellow 25 and black 26.

Figure 10:
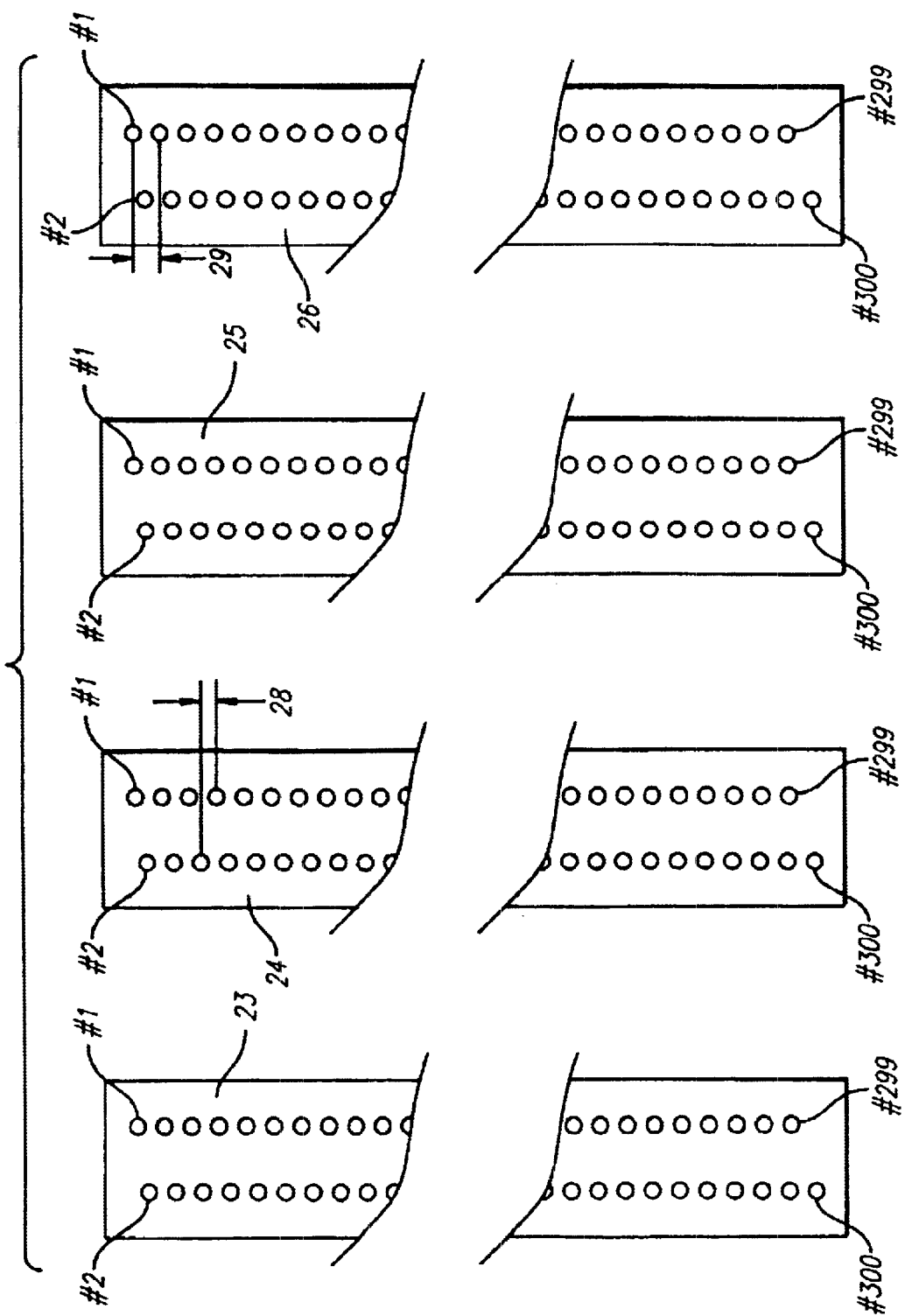
FIG. 10 is a bottom plan of the printheads or pens, showing their nozzle arrays.

Each of these pens, particularly in a large-format printer/plotter as shown, preferably includes a respective ink-refill valve 27. The pens, unlike those in earlier mixed-resolution printer systems, all are relatively long and all have nozzle spacing 29 (FIG. 10) equal to one-twelfth millimeter—along each of two parallel columns of nozzles. These two columns contain respectively the odd-numbered nozzles 1 to 299, and even-numbered nozzles 2 to 300.

The two columns, thus having a total of one hundred fifty nozzles each, are offset vertically by half the nozzle spacing, so that the effective pitch of each two-column nozzle array is approximately one-twenty-fourth millimeter. The natural resolution of the nozzle array in each pen is thereby made approximately twenty-four nozzles (yielding twenty-four pixels) per millimeter, or 600 per inch.

Preferably black (or other monochrome) and color are treated identically as to speed and most other parameters. In the preferred embodiment the number of printhead nozzles used is always two hundred forty, out of the three hundred nozzles (FIG. 10) in the pens.

This arrangement allows for software/firmware adjustment of the effective firing height of the pen over a range of ±30 nozzles, at approximately 24 nozzles/mm, or ±30/24= ±1¼ mm. This adjustment is achieved without any mechanical motion of the pen along the print-medium advance direction.

Alignment of the pens can be automatically checked and corrected through use of the extra nozzles. As will be understood, the invention is amenable to use with a very great variety in the number of nozzles actually operated.

4. Microprocessor Hardware a. Basic processing options—Data-processing arrangements for the present invention can take any of a great variety of forms. To begin with, image-processing and printing-control tasks 332, 40 can be shared (FIG. 11) among one or more processors in each of the printer 320 and an associated computer and/or raster image processor 30.

A raster image processor ("RIP") is nowadays often used to supplement or supplant the role of a computer or printer—or both—in the specialized and extremely processing-intensive work of preparing image data files for use, thereby releasing the printer and computer for other duties. Processors in a computer or RIP typically operate a program known as a "printer driver".

These several processors may or may not include general-purpose multitasking digital electronic microprocessors (usually found in the computer 30) which run software, or general-purpose dedicated processors (usually found in the printer 320) which run firmware, or application-specific integrated circuits (ASICs, also usually in the printer). As is well-understood nowadays, the specific distribution of the tasks of the present invention among all such devices, and still others not mentioned and perhaps not yet known, is primarily a matter of convenience and economics.

On the other hand, sharing is not required. If preferred the system may be designed and constructed for performance of all data processing in one or another of the FIG. 11 modules—in particular, for example, the printer 320.

Regardless of the distributive specifics, the overall system typically includes a memory 232*m* for holding color-corrected image data. These data may be developed in the computer or raster image processor, for example with specific artistic input by an operator, or may be received from an external source.

Ordinarily the input data proceed from image memory 232*m* to an image-processing stage 332 that includes some form of program memory 333—whether card memory or hard drive and RAM, or ROM or EPROM, or ASIC structures. The memory 232*m* provides instructions 334, 336 for automatic operation of rendition 335 and printmasking 337.

Image data cascades through these latter two stages 335, 337 in turn, resulting in new data 338 specifying the colorants to be deposited in each pixel, in each pass of the printhead carriage 20 over the printing medium 41. It remains for these data to be interpreted to form:

- actual printhead-actuating signals 53 (for causing precisely timed and precisely energized ink ejection or other colorant deposition 54),
- actual carriage-drive signals 57 (for operating a carriage-drive motor 35 that produces properly timed motion 55 of the printhead carriage across the printing medium), and
- actual print-medium-advance signals 46 (for energizing a medium-advance motor 42 that similarly produces suitably timed motion of the print-medium platen 43 and thereby the medium 41).

Such interpretation is performed in the printing control module 40. In addition the printing control module 40 may typically be assigned the tasks of receiving and interpreting the encoder signal 52 fed back from the encoder sensor 233.

Figures 1, 11:
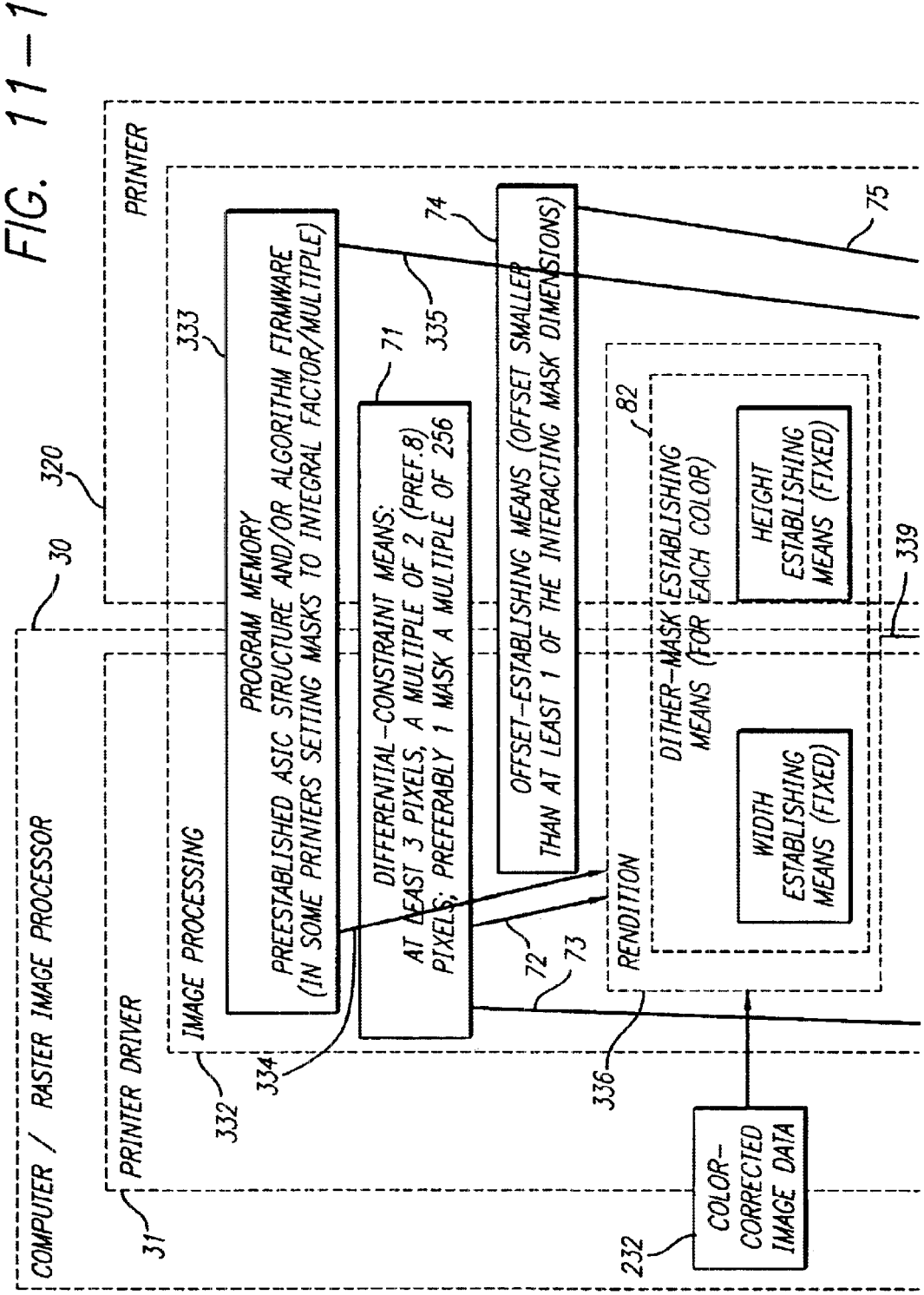
FIG. 11 is a highly schematic block diagram of the printer/plotter of FIGS. 6 through 10, particularly showing key signals flowing from and to one or more digital electronic microprocessors to effectuate printing.
Figures 2, 11:
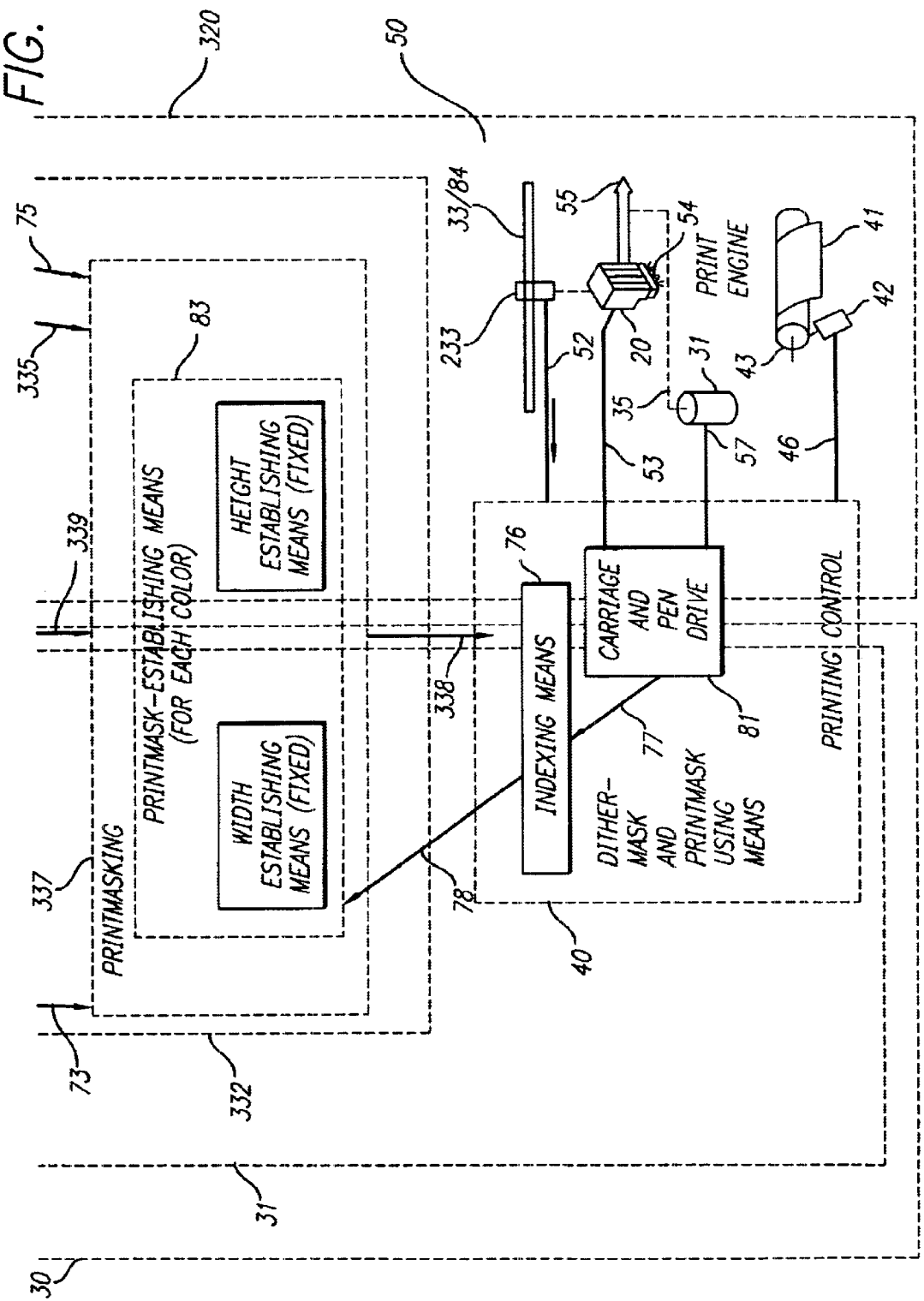

The printing-control stage 40 necessarily contains electronics and program instructions for interpreting the colorant-per-pixel-per-pass information 338. Most of this electronics and programming is conventional, and represented in the drawing merely as a block 81 for driving the carriage and pen. That block in fact may be regarded as providing essentially all of the conventional operations of the printing control stage 40.

b. Alternative subsystems for reducing repetitive patterning—Also appearing in FIG. 11 are certain specific modules and associated data-flow paths 71–78 implementing the present invention. It is very important to note that certain of these illustrated specific functions are alternatives, rather than subsystems that would typically coexist within any single printer/computer/RIP system.

This is mainly a matter of the particular environment in which the invention is to operate. In particular if the program memory 333 for a particular printer has yet to be designed and fabricated—or if it exists already but permits modification of the dither mask or printmask sizes (particularly widths), then the preferred mode of practice for at least the scan-axis repetition control takes the form of novel differential-constraint means 71.

The constraint-means block 71 is symbolized as having control paths 72, 73 to the rendition and printmask stages 336, 337 respectively. Physically, this simply means that the two mask-establishing functions 82, 83 within those stages 336, 337 have been coordinated, in the apparatus design.

"Mask-establishing functions" are performed in essence by algorithm and memory circuits that cooperate to set aside data blocks of specific sizes for masks, and also to fill those masks with specified values—and in due course to appropriately retrieve and use those numbers. In the dither-masking stage 82 the values are thresholds, and in the printmasking stage 83 they are typically pass numbers—both as well known in the art.

According to the present invention, by virtue of this precoordination symbolized as a constraint-means block 71, masks in the two stages are sized to satisfy certain constraints. The most important of those constraints is that the dither mask and printmask sizes not be integral factors or multiples of one another.

In particular, each mask differs from an integral factor or multiple of the other mask by some differential. A next most-important of the constraints is that this differential, measured in pixels, be a multiple of two—and preferably a multiple of eight. It is secondarily desirable that one of the mask sizes be a multiple of two hundred fifty-six pixels.

These secondary constraints or preferences essentially are simply statements of the amenability of the present invention to a substantially conventional programming and operating environment They are "important" and "desirable" not because the invention fails to operate successfully with a differential of three or seven—or with some odd mask size of forty three, or three hundred seven—but rather because the invention has greatest value under the stated conditions.

Another preferable condition is that the differential be at least three pixels; the purpose of this minimum differential is simply that the differential have some actual effect in stepping the boundaries between repeating tiles of the masks far enough to clear very small features of the image.

If on the other hand the program memory 333, in whatever form it may be, sets both the dither masks and printmasks to be integral factors or multiples of one another, irrevocably, then the size-differential module 71 cannot be present in the apparatus and the invention looks to alternative solutions. Initially, however, in this context the question arises: what constitutes "irrevocably".

An ASIC can always be discarded and another designed and built to go in its place, and firmware—much more readily—can be redesigned and loaded into a new ROM for field replacement. The invention, however, proceeds from the objective of avoiding all such radical cures.

If masks are integral factors or multiples of one another and—as a practical and economic matter—cannot be changed, then the alternative cure is to (1) establish an offset and (2) index the printmask (or dither mask if desired) by that offset between each pair of printhead scans. Most commonly it is the printmask that is more straightforwardly shifted, since printmasks are often or customarily made relatively accessible even in a completed product.

Suitable offset-establishing means 74 may be conceptualized as directing an offset control signal 75 to the printmasking function 337. Here the symbolism is perhaps more physically apt than in the differential-dimension method discussed above, because in the present case there physically exists either:

(1) an actual algorithmic shifting of a mask pattern, by an actual offset distance, or (2) an algorithmically selected succession of previously stored printmasks—that were initially generated through shifting a common pattern by such an actual offset.

In either event, the apparatus and method must provide not only the offset distance, as from the offset-establishing means 74 and its control path 75, but also the indexing or shifting action itself. As a practical matter, however, if selection from a sequence is the strategy chosen, the shifting operation may do double duty—because in some printmasking operations the system shuffles masks between scans anyway.

The shifting action may be conceptualized as performed by an indexing-means module 76 triggered by a signal 77 from a portion of the carriage and pen drive 81 which interleaves the indexing function between successive scans of the printhead. Equivalently, the indexing means 76 and carriage/pen drive 81 may both be synchronized from some common clock (not shown).

However triggered, the indexing means 76 respond by feeding a signal 78 back to the printmasking stage 337, to announce that it is time to either (as described above) shift the pattern or select the next pattern in sequence. The offset distance by which the mask is shifted, at whichever time that is done, should be smaller than at least one of the masks (dither mask or printmask) and preferably satisfy the size conditions discussed earlier.

Although the dimension-differential and offset forms of the invention have been presented above as alternatives, it is also true that in a system capable of using the dimension-differential strategy the two forms of the invention can be used together. For reasons outlined previously, in many systems it is most natural to use the differential methodology for the scan axis and the offset methodology to extend the period along the printing-medium advance axis.

5. Method

The several forms of the invention may also be seen in terms of method, as distinguished from apparatus. The offset strategy has three main steps, as outlined in the earlier "SUMMARY OF THE DISCLOSURE".

Figure 12:
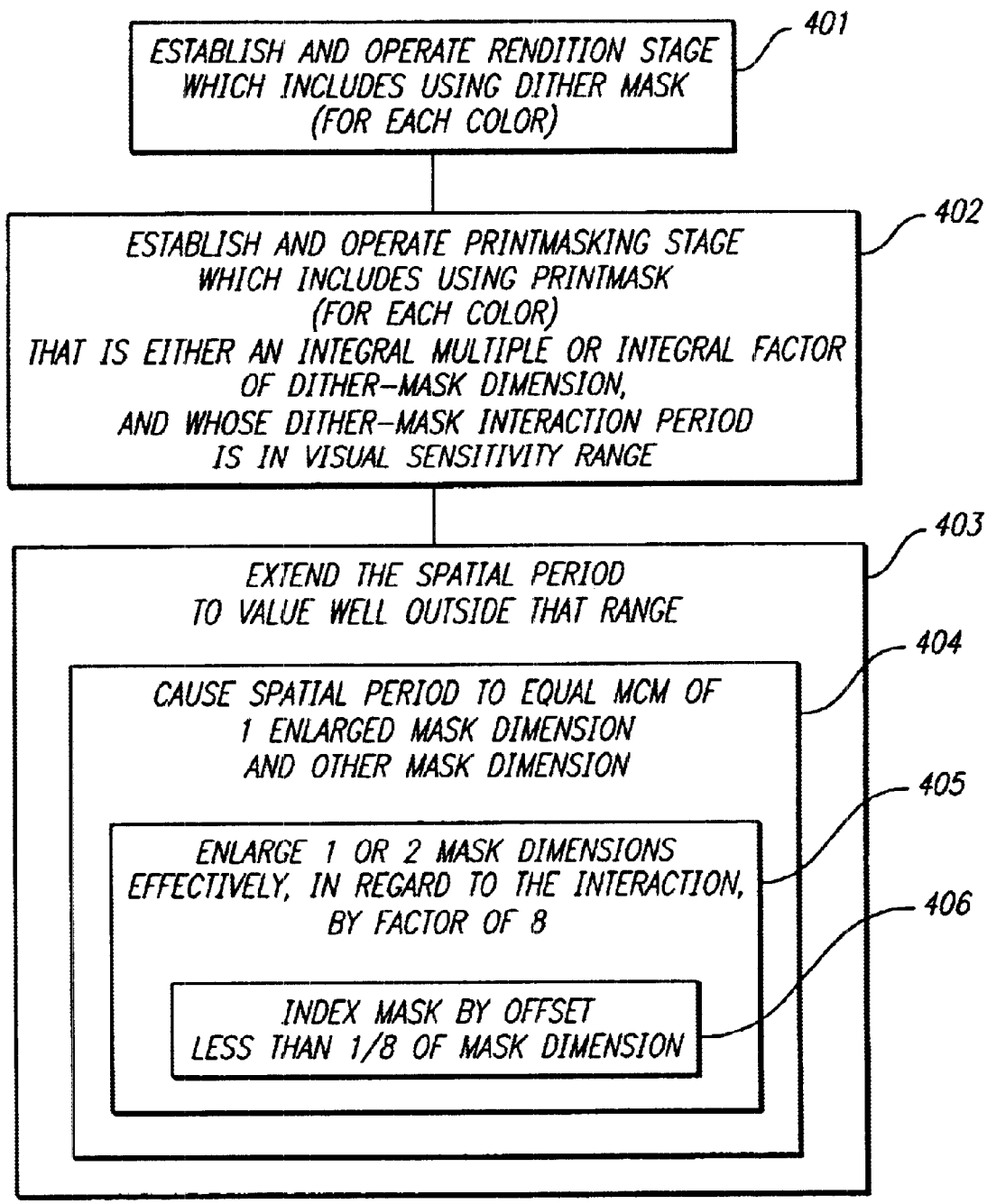
FIG. 12 is a flow chart showing method features of the invention.

One of these steps is rendition-stage establishment and operation 401 (FIG. 12). Another is printmasking-stage establishment and operation 402.

These steps respectively include using a dither mask and printmask (for each color). The printmask is either an integral multiple or integral factor of a dither-mask dimension.

This latter condition points up the fact that the dimension-differential method is not being used for the critical dimensions of these masks. The interaction period for these mask-using steps is in the human high-visual-sensitivity range.

The third main step is extension 403 of the spatial interaction period to a value well outside that high-sensitivity range. This step has several preferences 404–406 that can be conceptualized as nested.

The prime substep for performing the period-extension step 403 is causing 404 the spatial period to equal the minimum common multiple (MCM) of the one enlarged mask dimension and other (not enlarged) mask dimension. This substep 404 in turn is best accomplished by an effective enlargement 405 of one (or both) mask dimensions by a factor of eight—or, as noted earlier, at least two.

This enlargement is not performed actually, but rather only in effect, and in regard to the interaction. The favored procedure for performing the enlargement 405 is indexing 406 of one of the masks (usually the printmask) by an offset that is preferably less than one-eighth of the subject dimension of that mask.

The above disclosure is intended as merely exemplary, and not to limit the scope of the invention—which is to be determined by reference to the appended claims.

What is claimed is:

1. Apparatus for printing a desired image on a printing medium, by construction from individual marks formed in a pixel array; said apparatus comprising:

means for establishing a dither mask having a dimension;

means for establishing a printmask having a corresponding dimension that is neither a factor nor an integral multiple of the dither-mask dimension; and means for using the dither mask to render the image and using the printmask to print the rendered image.

2. The apparatus of claim 1, wherein:
the dither-mask dimension is a width; and
the printmask dimension is a width.

3. The apparatus of claim 2, wherein:
the dither-mask establishing means and printmask establishing means also establish another pair of corresponding dimensions that are both heights.

4. The apparatus of claim 1, wherein:
the dither-mask dimension is a height; and
the printmask dimension is a height.

5. The apparatus of claim 1, wherein:
the dither-mask dimension and the corresponding printmask dimension differ by at least three pixels.

6. The apparatus of claim 5, wherein:
the dither-mask dimension and the corresponding printmask dimension differ by a multiple of two pixels.

7. The apparatus of claim 1, wherein:
the dither-mask dimension and the corresponding printmask dimension differ by a multiple of two pixels.

8. The apparatus of claim 1, wherein:
the dither-mask dimension and the corresponding printmask dimension differ by eight pixels or a multiple of eight pixels.

9. The apparatus of claim 1, wherein:
one of said dither-mask and printmask dimensions is an integral multiple of 256 pixels; and
the other of said dither-mask and printmask dimensions differs by an integral multiple of eight pixels from said integral multiple of 256 pixels.

10. The apparatus of claim 1, further comprising:
a scanning printhead that makes multiple passes across the printing medium;
means for establishing an offset that is smaller than at least one of said dither-mask and printmask dimensions; and
means for indexing one of the dither mask and printmask by said offset, between passes of the scanning printhead.

11. The apparatus of claim 1, for use in making the marks in plural colors; and wherein:
the dither-mask establishing means comprise means for establishing respective dither masks for the plural colors respectively;
the printmask establishing means comprise means for establishing respective printmasks for the plural colors respectively; and
the using means comprise respective means for using the plural dither masks and plural printmasks to render and print the image in the plural colors respectively.

12. Apparatus for printing a desired image on a printing medium, by construction from individual marks formed in a pixel column-and-row array; said apparatus comprising:
at least one scanning printhead that makes multiple passes across the printing medium;
means for establishing a dither mask having a dimension;
means for establishing a printmask having a corresponding dimension;
means for establishing an offset that is smaller than at least one of said dither-mask and printmask dimensions;
means for indexing one of the dither mask and printmask by said offset, between passes of the scanning printhead; and
means for using the dither mask to render the image and using the printmask in controlling the printhead to print the rendered image.

13. The apparatus of claim 12, wherein:
the dither-mask establishing means and the printmask-establishing means comprise at least one preprogrammed circuit for implementing the dither mask and printmask;
said printmask corresponding dimension being an integral multiple or an integral factor of the dither-mask dimension;
said preprogrammed circuit being substantially incapable of effectuating small changes in either of said dimensions.

14. The apparatus of claim 13, wherein:
the preprogrammed circuit comprises an application-specific integrated circuit.

15. The apparatus of claim 13, wherein:
said preprogrammed circuit is substantially incapable of effectuating any change in either of said dimensions.

16. The apparatus of claim 12, wherein:
the dither-mask establishing means and the printmask-establishing means comprise at least one preprogrammed algorithm for implementing the dither mask and printmask;
said printmask corresponding dimension is an integral multiple or an integral factor of the dither-mask dimension; and
said preprogrammed algorithm is substantially incapable of efficiently effectuating small changes in either of said dimensions.

17. The apparatus of claim 16, wherein:
the preprogrammed algorithm comprises a firmware module held in a read-only memory.

18. The apparatus of claim 16, wherein:
said preprogrammed algorithm is substantially incapable of efficiently effectuating any change in either of said dimensions.

19. The apparatus of claim 12, for use in making the marks in plural colors; and wherein:
the at least one scanning printhead comprises plural printheads that each make said multiple passes;
said plural printheads comprising means for respectively printing with respective plural colorants; and
each of the establishing, indexing and using means comprise plural means for respectively establishing, indexing and using with respect to the respective plural colorants.

20. A method of printing desired images on a printing medium, by construction from individual marks formed in a pixel column-and-row array by a scanning multiple-nozzle pen that operates in conjunction with a printing-medium advance mechanism; said method comprising the steps of:
establishing and operating a rendition stage that includes using a dither mask which has a dimension;
establishing and operating a printmasking stage that includes using a printmask that has a dimension which is an integral multiple or an integral factor of the dither-mask dimension;
said dither mask and printmask dimensions having an interaction that establishes a spatial periodicity which is well within a range to which human vision is sensitive; and
extending the spatial periodicity of the interaction between the dimensions to a value well outside said range.

21. The method of claim 20, wherein:

the extending step comprises causing at least one of the mask dimensions to be effectively larger, in regard to its interaction with the other of the mask dimensions.

22. The method of claim 21, wherein:

the causing step comprises effectively enlarging said at least one of the mask dimensions by a factor of at least two.

23. The method of claim 22, wherein:

the factor is at least eight.

24. The method of claim 22, wherein:

the causing step comprises indexing said at least one of the masks by an offset that is less than half of said at least one of the mask dimensions; and the factor is equal to the ratio of said at least one of the mask dimensions and the offset.

25. The method of claim 22, wherein:

the causing step causes the spatial periodicity to be equal to the minimum common multiple of said one of the mask dimensions, as thus effectively enlarged, and the other of the mask dimensions.

26. The method of claim 22, for use in printing the images in plural colors using said at least one scanning pen that comprises respective plural pens which respectively deposit marks of respective plural colorants, and wherein:

the rendition-stage establishing and operating step comprises the substeps of respectively establishing and operating rendition stages for the respective plural colors;

the printmasking-stage establishing and operating step comprises the substeps of respectively establishing and operating printmasking stages for the respective plural colors; and the extending step comprises the substeps of respectively extending spatial periodicity for the respective plural colors.

* * * * *